United States Patent
Weber

(10) Patent No.: US 7,284,032 B2
(45) Date of Patent: Oct. 16, 2007

(54) METHOD AND SYSTEM FOR SHARING INFORMATION WITH USERS IN A NETWORK

(75) Inventor: Barry Jay Weber, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 565 days.

(21) Appl. No.: 10/025,161

(22) Filed: Dec. 19, 2001

(65) Prior Publication Data
US 2003/0115274 A1    Jun. 19, 2003

(51) Int. Cl.
*G06F 15/13* (2006.01)

(52) U.S. Cl. .......................... 709/204; 725/37; 725/87; 725/109

(58) Field of Classification Search ................ 709/204; 725/37, 87, 109
See application file for complete search history.

(56) References Cited

U.S. PATENT DOCUMENTS

| | | | |
|---|---|---|---|
| 5,861,881 A | 1/1999 | Freeman et al. | 345/302 |
| 6,172,712 B1 | 1/2001 | Beard | 348/552 |
| 6,215,526 B1 | 4/2001 | Barton et al. | 348/473 |
| 6,233,389 B1 | 5/2001 | Barton et al. | 386/46 |
| 6,236,395 B1 | 5/2001 | Sezan et al. | 345/328 |
| 6,598,074 B1 * | 7/2003 | Moller et al. | 709/204 |
| 2002/0056123 A1 * | 5/2002 | Liwerant et al. | 725/87 |
| 2005/0246752 A1 * | 11/2005 | Liwerant et al. | 725/109 |

OTHER PUBLICATIONS

DeMartin et al., "Multimedia Information Transfer Via A Wide Area Network", Pub. No. US 2001/0013061, Aug. 9, 2001.*
Moynihan, "Personal Video Channel System", Pub. No. US 2002/0056119, May 9, 2002.*
Hamaide et al., "Method For Controlling The Presentation Of Multimedia Content On An Internet Web Page", Pub. No. US 2002/0103830, Aug. 1, 2002.*
Knowles et al., "System And Method For Facilitating User Access To Content Stored On Private Networks", Pub. No. US 2003/0046703. Mar. 2003.*

* cited by examiner

*Primary Examiner*—Jinsong Hu
(74) *Attorney, Agent, or Firm*—Joseph J. Laks; Robert D. Shedd; Brian J. Cromarty

(57) ABSTRACT

A method for sharing information in a network includes steps of enabling a user to define a data segment, recording the defined data segment, transmitting first information associated with the defined data segment to a remote location, and receiving second information associated with the defined data segment from the remote location. An apparatus for performing the foregoing steps is also provided.

19 Claims, 4 Drawing Sheets

HIGHLIGHT GUIDE 300

| SHOW | DATE | TIME | DURATOIN | RECOMMENDED BY |
|---|---|---|---|---|
| RAIDERS VS. CHIEFS | 11/10/00 | 1:36 | 10 MIN. | SELF |
| FRIENDS | 10/1/00 | 8:20 | 5 MIN. | JOHN Q |
| OLYMPICS | 9/20/00 | 8.45 | 3 MIN. | JOE SMITH |

310 — (table rows above)

320 —

| SORT | DELETE | MODIFY | ANNOTATE |
|---|---|---|---|

FIG. 3

HIGHLIGHT ENTRY MODIFICATION 400

410 — RAIDERS VS. CHIEFS  11/10/00  1:36  2/+5

420 —

| ADD POST TIME | ADD PRETIME | REDUCE POST TIME | REDUCE PRE TIME |
|---|---|---|---|
| MARK ENTIRE PROGRAM AS HIGHLIGHT | | DELETE | |

FIG. 4

METHOD AND SYSTEM FOR SHARING INFORMATION WITH USERS IN A NETWORK

BACKGROUND OF THE INVENTION

1. Field of the Invention

The present invention generally relates to devices for recording data such as video data, and more particularly, to a method and system for enabling users of such devices to, among other things, share information associated with recorded data segments with a plurality of other users within a network.

2. Background Information

Data recording devices, such as personal video recorders ("PVRs"), are generally known in the art. Such devices enable users to, among other things, record video data and replay the recorded video data at a later time. In this manner, PVRs provide certain functionality similar to conventional video cassette recorders ("VCRs"). However, PVRs store data in solid-state digital memories (e.g., hard disk), whereas VCRs store data on magnetic tapes. As a result of this difference, PVRs provide certain advantages over conventional VCRs. For example, PVRs offer users greater flexibility in their ability to identify, record and retrieve data segments that may be of interest. Accordingly, it is anticipated that the use of PVRs will likely increase in the future.

As the use of PVRs increases and the cost of solid state memory decreases, the quantity of recorded data among PVR users will likely increase. As this quantity of recorded data accumulates, it becomes more difficult for PVR users to decide what data may be of interest to them, thereby requiring the users to spend valuable time sorting through hours of recorded data. Accordingly, there is a need for a system which helps users save time in identifying recorded data that may be of interest to them.

Pursuant to the foregoing need, it is desirable for PVRs to provide a mechanism through which multiple users can share information regarding data segments of interest, such as television program highlights. One technique for sharing data segments of interest is for a user to record a given data segment, and send the recorded segment to other users via, for example, the internet. This technique, however, is problematic in many respects. For example, a large amount of bandwidth is required to send certain types of data segments, such as video data segments. Likewise, a user that receives data segments from several other users must utilize valuable memory resources in order to store the received segments. Moreover, there are potential copyright issues associated with the unrestricted transmission of recorded data segments. Accordingly, there is a need for a method and system which addresses these and other issues.

SUMMARY OF THE INVENTION

In accordance with the present invention, a method for sharing information in a network is provided. The method comprises steps of enabling a user to define a data segment, recording the defined data segment, transmitting first information associated with the defined data segment to a remote location, and receiving second information associated with the defined data segment from the remote location. An apparatus capable of performing the foregoing steps is also disclosed herein.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is an exemplary display illustrating one aspect of the present invention;

FIG. 4 is an exemplary display illustrating another aspect of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
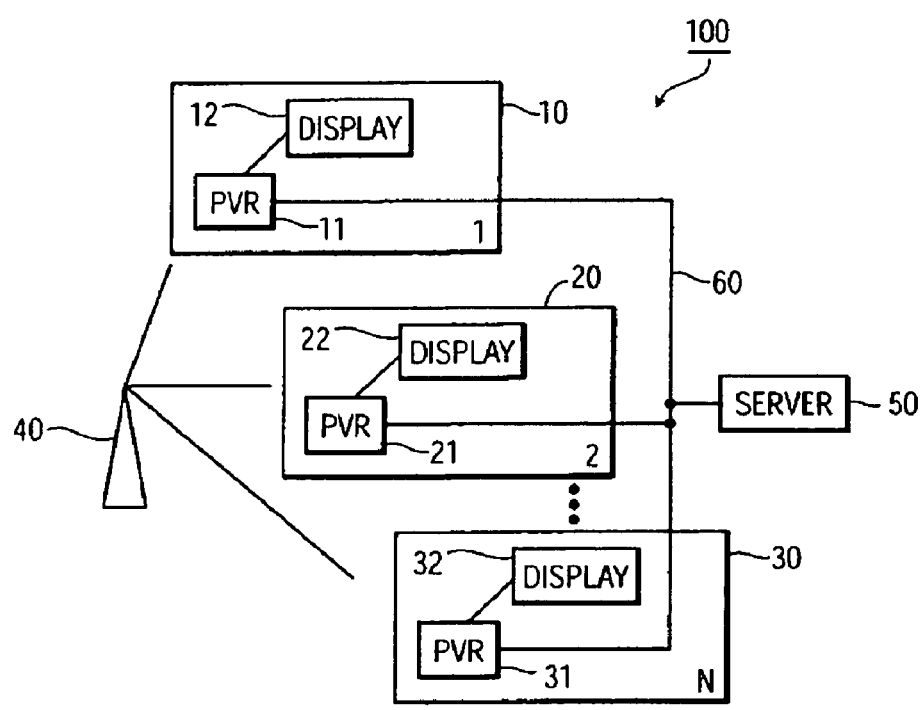
FIG. 1 is a diagram of an exemplary environment suitable for implementing the present invention.

Referring now to the drawings, and more particularly to FIG. 1, a diagram of an exemplary environment suitable for implementing the present invention is shown. In FIG. 1, an environment 100 comprises a plurality of exemplary user systems 10, 20, 30. For purposes of explanation and example, the environment 100 is shown as including only three user systems (i.e., 1, 2 . . . N). In practice, however, it is contemplated that many more such user systems will be included in the environment 100. For example, there may be one or more such user systems associated with a given household. As will be described later herein, the user systems collectively represent a peer-to-peer network in which data segments such as video data segments may be recorded by individual users, and information associated with the recorded data segments, such as metadata, may be shared with other users within the network.

Each of the user systems 10, 20, 30 is capable of, among other things, receiving, recording and displaying data. More specifically, each of the user systems 10, 20, 30 comprises a PVR 11, 21, 31, and a display device 12, 22, 32, respectively. Each of the display devices 12, 22, 32 includes a variable visual display terminal and may, for example, be embodied as a television signal receiver, monitor or other device. Further details regarding the PVRs 11, 21, 31 will be provided later herein with reference to FIG. 2.

A data transmission source 40 transmits data such as video, audio, internet and/or other data in digital and/or analog format to each of the plurality of user systems 10, 20, 30. The data transmission source 40 may, for example, transmit data via terrestrial, cable, satellite and/or other type of broadcast and/or multicast means.

A server 50 is operably coupled to each of the systems 10, 20, 30 via a communication network 60 such as a telephone, cable, fiber optic, ethernet, wireless and/or other network. The server 50 is capable of, among other things, receiving information associated with recorded data segments from the user systems 10, 20, 30, compiling the received information, and transmitting the compiled information to the user systems 10, 20, 30. In the event that the environment 100 is large and distributed, there may be a plurality of such servers 50, each servicing a particular portion of the environment's 100 user systems.

In operation, each of the user systems 10, 20, 30 receives data such as video data (e.g., a television program) via the data transmission source 40. The PVRs 11, 21, 31 of the user systems 10, 20, 30 record segments of the received data in dependence upon inputs from their respective users. Recorded segments may also be modified by users, as will be described later herein. Periodically, information associated with the recorded data segments is transmitted from each of the user systems 10, 20, 30 to the server 50. In particular, the information associated with a given recorded data segment defines certain parameters of the segment, such as its starting point and ending point, but does not constitute the segment itself. Accordingly, bandwidth on the network 60 and memory capacity of the server 50 are conserved since the transmitted information associated with the recorded segments is much less voluminous than the data segments themselves. The server 50 compiles the segment information received from each of the user systems 10, 20, 30, and distributes the same to the user systems 10, 20, 30. In this manner, information associated with data segments of potential interest may be shared with many users. Further details regarding the operation of components within the environment 100 will be provided later herein.

Figure 2:
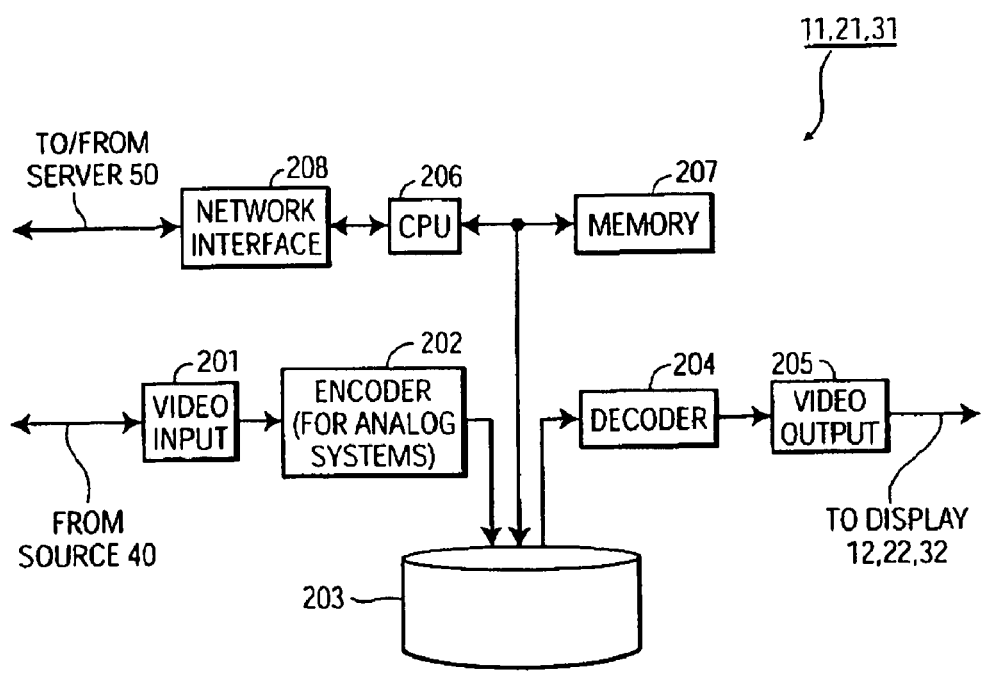
FIG. 2 is a diagram showing further details of a PVR of FIG. 1.

Referring now to FIG. 2, a diagram providing further details of a PVR 11, 21, 31 of FIG. 1 is shown. Note that the details shown in FIG. 2 are merely exemplary, and are not intended to be limiting in any manner. Moreover, the PVR 11, 21, 31 of FIG. 2 is shown, and will be described, with a primary emphasis on video data. However, it will be intuitive to those skilled in the art that other types of data (e.g., audio, internet, etc.) may also be accommodated. It is contemplated that the PVR 11, 21, 31 shown in FIG. 2 may be constructed using a commercially-available PVR, such as an RCA branded PVR, although each of the PVRs 11, 21, 31 of FIG. 1 may be from a different manufacturer.

In FIG. 2, a video input unit 201 receives and processes digital and/or analog video input data provided from the data transmission source 40. An encoder 202 receives output data from the video input unit 201, and selectively performs an encoding operation upon the received data. In particular, when the data outputs provided from the video input unit 201 are in an analog format or an undesired digital format, the encoder 202 performs an encoding operation to convert the analog or digital outputs to a predetermined digital format. Alternatively, when the data outputs provided from the video input unit 201 are already in the predetermined digital format, no encoding operation by the encoder 202 is necessary.

A non-volatile storage unit 203, such as a hard disk drive or other storage medium, receives and stores the digital data provided from the encoder 202. A decoder 204 performs a decoding operation upon the data stored in the non-volatile storage unit 203 to facilitate data playback. A video output unit 205 receives decoded data output from the decoder 204, and performs a processing operation thereon. Outputs from the video output unit 205 are provided to the display 12, 22, 32 of FIG. 1.

A central processing unit ("CPU") 206 controls the general operations of the PVR 11, 21, 31. For example, the CPU 206 receives user inputs via an input terminal (not shown), and based on the user inputs, enables a received data segment to be recorded in the non-volatile storage unit 203. A memory 207 stores data, such as operating system data, file management data, and application program data, which is selectively retrieved and utilized by the CPU 206 during operation of the PVR 11, 21, 31. A network interface unit 208 also communicates with the CPU 206, and enables data to be exchanged with the server 50 under the control of the CPU 206.

Referring to FIGS. 3 and 4, exemplary displays illustrating different aspects of the present invention are shown. In particular, the display 300 of FIG. 3 illustrates a highlight guide according to principles of the present invention, while the display 400 of FIG. 4 illustrates an interface for modifying an entry of the highlight guide according to principles of the present invention. The displays 300 and 400 may be provided, for example, on the display devices 12, 22, 32 of FIG. 1.

In FIG. 3, the display 300 illustrates a highlight guide including a segment listing portion 310 and a command menu portion 320. As shown in FIG. 3, the segment listing portion 310 of the highlight guide includes various information regarding segments that have been defined by a user and recorded by a PVR 11, 21, 31. For purposes of example and explanation, the segment listings are shown as video segment listings corresponding to certain television shows. More specifically, each video segment listing in the segment listing portion 310 of FIG. 3 includes a show description or name (e.g., "Raiders vs. Chiefs", "Friends", "Olympics"), a date corresponding to the show, a time corresponding to the show, a duration of the particular segment, and an entry indicating who recommended the segment. Of course, other types of information may also be included or substituted in the segment listing portion 310 of the highlight guide in accordance with principles of the present invention. For example, a description field may be included in the segment listing portion 310 so that users may provide comments or other information describing a particular segment. Depending upon the types of information included in the segment listing portion 310 of the highlight guide, an alphanumeric keyboard may not be necessary since current program guide technology and local clocks can be used to generate certain information.

It is also noted that multiple highlight guides may be created by a user based on segment content. For example, there may be a separate highlight guide for each type of segment content, such as sports, news, soap operas, action movies, etc. In this manner, when users define segments, they may designate which highlight guide(s) they want the segments to be included in. Moreover, each highlight guide may correspond to a particular peer group for purposes of distribution. For example, a user may designate which other users within the environment 100 will receive segment information corresponding to a particular highlight guide. Accordingly, when the server 50 transmits segment information received from a particular user system 10, 20, 30, segment information corresponding to one highlight guide may be distributed to one group of users within the environment 100, while segment information corresponding to another highlight guide may be distributed to another group of users within the environment 100.

Also as shown in FIG. 3, the command menu portion 320 of the highlight guide provides various command options which a user may use to operate upon the highlight guide. For example, the command menu portion 320 provides: (1) a sort command which enables a user to sort the various segment listings of the segment listing portion 310 in a desired order; (2) a delete command which enables a user to delete an entire segment listing from the segment listing portion 310; (3) a modify command which enables a user to modify a segment listing within the segment listing portion 310 (as will be described in further detail with reference to FIG. 4); and (4) an annotate command which enables a user to annotate a segment listing within the segment listing portion 310 by providing comments (e.g., text) regarding a segment listing. Of course, other commands may be included or substituted in the command menu portion 320 of the highlight guide in accordance with principles of the present invention. For example, one or more commands may be provided which allow a user to create a personal playlist by grouping together segment information from one or more segments (e.g., "My Favorite Pacer Highlights").

The display 400 of FIG. 4 also includes a segment listing portion 410 and a command menu portion 420. In particular, the segment listing portion 410 and the command menu portion 420 of FIG. 4 enable a user to modify a segment listing in the highlight guide. This operation corresponds to the modify command of the command menu portion 320 of FIG. 3. As indicated in FIG. 4, the segment listing portion 410 provides information regarding the particular segment listing within the highlight guide being modified. In particular, the segment listing portion 410 includes a show description or name (e.g., "Raiders vs. Chiefs"), a date corresponding to the show, a time corresponding to the show, and a description of the modification. In FIG. 4, for example, the modification reduces a starting point of the segment (i.e., reduce pre time) by 2 minutes, and expands an ending point of the segment (i.e., add post time) by 5 minutes. Of course, other types of information may also be included or substituted in the segment listing portion 410 of the display 400 in accordance with principles of the present invention.

Also in FIG. 4, the command menu portion 420 of the display 400 provides various command options which a user may use to operate upon a segment of the highlight guide. For example, the command menu portion 420 provides: (1) an add post time command which enables a user to add a specified amount of time to the ending point of a segment; (2) an add pretime command which enables a user to add a specified amount of time to the starting point of a segment; (3) a reduce post time command which enables a user to delete a specified amount of time from the ending point of a segment; (4) a reduce pre time command which enables a user to delete a specified amount of time from the starting point of a segment; (5) a command which enables a user to mark an entire program as a highlight; and (6) a delete command which enables a user to delete an entire segment listing from the highlight guide. Of course, other commands may be included or substituted in the command menu portion 420 of the display 400 in accordance with principles of the present invention.

Figure 5:
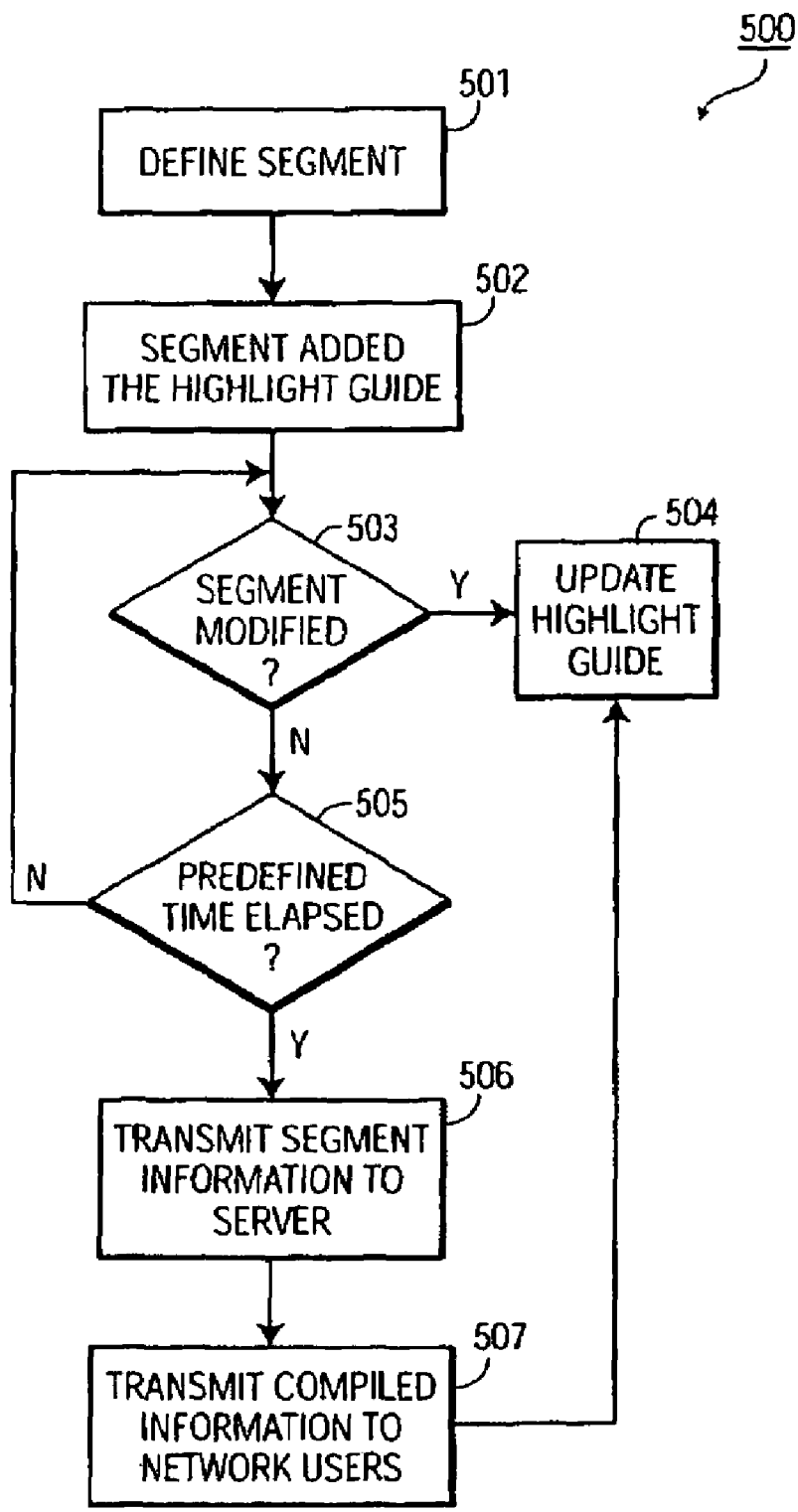
FIG. 5 is a flowchart illustrating exemplary steps for practicing the present invention.

Referring to FIG. 5, a flowchart illustrating exemplary steps for practicing the present invention is shown. For purposes of example and explanation, the steps of FIG. 5 will be described in relation to the environment 100 of FIG. 1 and its associated components. Moreover, for simplicity many of the steps of FIG. 5 are described with reference to a user of only one of the user systems 10, 20, 30 of FIG. 1. However, in practice, it is contemplated that such steps may be performed by users of all of the user systems 10, 20, 30.

At step 501, a user corresponding to a user system 10, 20, 30 provides inputs to its PVR 11, 21, 31 to define a particular data segment, and thereby causes the PVR 11, 21, 31 to record the defined segment. According to an exemplary embodiment, a user defines a segment by providing inputs to the PVR 11, 21, 31 specifying the starting point and the ending point of the segment. As previously indicated herein, the defined segment may, for example, be a desired portion of a television program. In order to facilitate certain segment modifications (e.g., add post time, add pretime, reduce post time, reduce pretime—see FIG. 4), the present invention automatically records a predetermined amount of time (e.g., 5 minutes) both prior to the specified starting point and after the specified ending point of the defined segment.

Next, at step 502, the PVR 11, 21, 31 adds the defined segment to the highlight guide. That is, the defined segment becomes part of the current highlight guide and is listed as shown, for example, in FIG. 3. Although not expressly indicated in FIG. 5, steps 501 and 502 may be repeated for as many segments as users want to define.

At step 503, the PVR 11, 21, 31 detects whether any segment within the current highlight guide has been modified by a user, for example as depicted in FIG. 4. In the event that a segment has been modified, then process flow advances to step 504 where the PVR 11, 21, 31 causes the current highlight guide to be updated to reflect the detected modification. For example, if a segment is expanded to include more time (e.g., add post time, add pretime), and/or compressed to reduce time (e.g., reduce post time, reduce pretime), then the highlight guide such as the one shown in FIG. 3 is updated to reflect the corresponding modification. As a further example, if a user decides to delete a stored show which has a segment included in the highlight guide, there are different ways in which this event may be handled. According to an exemplary embodiment, the user may be notified via the display 12, 22, 32 that there is a highlight associated with the show to be deleted. In response to this notification, the user may provide an input to change his or her decision and maintain the stored show, or alternatively may choose to maintain just the highlighted portion of the show, or may choose to continue with the deletion. According to another embodiment, however, the highlighted portion of the show may be automatically saved by the PVR 11, 21, 31, while the remaining portion of the show is deleted.

Referring back to step 503, if the PVR 11, 21, 31 does not detect a modification to any segment, then process flow advances to step 505 where the PVR 11, 21, 31 determines whether a predefined time period has elapsed since the last time information associated with segments from the highlight guide were provided to the server 50. According to an exemplary embodiment, each of the PVRs 11, 21, 31 transmits information associated with the segments from its highlight guide to the server 50 according to a predefined time schedule (e.g., once a day/week/month etc.). This time schedule may be definable by a user, and/or may be different or staggered in time for each PVR 11, 21, 31 to avoid excessive traffic on the network 60 that may result, for example, from simultaneous transmissions by all of the PVRs 11, 21, 31.

As long as the predefined time period has not elapsed, process flow loops back to step 503 where each of the PVRs 11, 21, 31 continues to detect modifications to the segments within its highlight guide. However, once the predefined time period elapses, process flow advances to step 506 where each of the PVRs 11, 21, 31 transmits information associated with the segments within its highlight guide(s) to the server 50 which compiles the received information. In order for the environment 100 to accommodate PVRs of multiple manufacturers, the present invention utilizes a common language to define the segment information transmitted at step 506. Moreover, these transmissions are preferably encrypted to protect privacy.

According to an exemplary embodiment, the common language used to define the information transmitted at step 506 is provided using standard internet protocols and an extended mark-up language ("XML"). The information associated with each data segment may be in the form of metadata, and is preferably similar to entries of the highlight guide. For example, the information associated with each data segment may define the following parameters: a unique program identification that can be correlated back to a specific program start time, a program number, a segment start time, a segment end time, user comments, and a descriptor indicating whom the message is from.

According to an exemplary embodiment, when the server 50 compiles the received segment information, a time adjustment operation may be performed to compensate for signal delay differences within the environment 100. For example, if one user system 10, 20, 30 receives a segment via satellite with a three second delay, and another user system 10, 20, 30 receives the same segment via terrestrial broadcast with a one second delay, a two second time compensation must be performed so that the segment is time aligned between the two user systems. Accordingly, the server 50 may adjust the time stamps (e.g., the segment start time/end time) of the received segment information. Such adjustments can be enabled, for example, from transmission timing data corresponding to various transmission sources.

It is also noted that the segment information transmitted to the server 50 at step 506 may be provided from sources other than the user systems 10, 20, 30. For example, in the sports industry there are professional entities that create highlights of various sporting events. Segment information associated with such highlights may also be transmitted to the server 50 at step 506, where it is compiled in the previously described manner. Such segment information may, for example, be made available to users on a subscription basis.

Next, at step 507, the server 50 transmits the compiled segment information to the appropriate user systems 10, 20, 30 within the environment 100. Like the transmissions at step 506, the transmission performed at step 507 preferably uses the same common language and is encrypted to protect privacy. In response to receipt of the segment information, each of the PVRs 11, 21, 31 may update its highlight guide at step 504 depending upon whether the particular segment is stored on the PVR 11, 21, 31. That is, if a PVR 11, 21, 31 receives information associated with a data segment which is currently stored on the PVR 11, 21, 31, then an entry is made in that PVR's 11, 21, 31 highlight guide indicating that a highlight is available for that particular data segment. Of course, the received information associated with a given data segment may define a portion of the data segment that is longer or shorter in duration than the recorded data segment. That is, the received information associated with a data segment may specify a starting point and/or ending point different than a starting point and/or ending point of the recorded data segment. For example, the data segment recorded on the PVR 11, 21, 31 may represent an entire episode of a television program, while the received information associated with the data segment (i.e., television program) may define only a portion of the television program. As a further example, the data segment recorded on the PVR 11, 21, 31 may represent only a portion of a television program, while the received information associated with the data segment (i.e., television program) may define the entire television program. In this latter situation, an entry may still be made in that PVR's 11, 21, 31 highlight guide indicating that a highlight is available for the particular data segment, but the user will only have access to the portion of the data segment that is actually recorded on the PVR 11, 21, 31.

Conversely, if a PVR 11, 21, 31 receives information associated with a data segment which is not at all stored on the PVR 11, 21, 31, then according to one embodiment, that information is automatically disregarded by the PVR 11, 21, 31. According to another embodiment, however, the information associated with the unrecorded data segment may still be added to the highlight guide of the PVR 11, 21, 31 at step 504. In this embodiment, the server 50 may store information such as program guide information, and provide such information to the PVR 11, 21, 31 at step 507 indicating the next available time(s) when the unrecorded data segment will be aired. This embodiment may also utilize a network PVR (not shown). In this case, a network PVR records all broadcast shows onto a server/headend and makes them available to subscribers. In this manner, there is no issue if a PVR 11, 21, 31 receives information associated with a data segment which is not at all stored on the PVR 11, 21, 31, since access to the segment can be readily obtained after the original broadcast.

In addition to the previously described features, the present invention may also be used to provide various other features. In particular, the environment 100 of FIG. 1 may be used to accommodate recommendations from users that have similar tastes. For example, if a user generates a lot of highlights from a television show that is repeated, that user may send messages to other users within the environment 100 recommending the show. Such messages may, for example, be in the form of an electronic mail message or as a message which supplements the segment information transmitted to the server at step 506 of FIG. 5. If a user receiving such a message is interested in the recommended topic or show, then it is likewise desirable for the PVRs 11, 21, 31 to enable automatic or semi-automatic recording of data from one user to another.

Another feature that may be accommodated by the environment 100 of FIG. 1 is targeted advertisement. For example, the server 50 may include a database which relates particular shows or types of shows to particular advertisements. In this manner, the server 50 may keep track of each user's show preferences, and transmit targeted advertisements to each user along with the compiled segment information at step 507. Such advertisements may then, for example, be displayed along with the highlight guide. Such a feature thereby provides a means by which an entity operating the server 50 may generate advertisement revenue.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for sharing information in a network, comprising steps of:
    enabling a first user to define a data segment;
    recording the defined data segment at a first of a plurality of user systems connected to the network;
    transmitting first information identifying the recorded data segment to a remote location, said first information being data other than the recorded data segment and said transmission precluding the transmission of said recorded data;

receiving, at the first of the plurality of user systems, from a second of plurality of user systems via the remote location, second information identifying said defined data segment within said recorded data segment located at said first user system connected to the network, said second information being data other than the recorded data segment and precluding the transmission of said recorded data.

2. The method of claim 1, wherein the defined data segment comprises a portion of a television program.

3. The method of claim 1, wherein the user defines the data segment by specifying a starting point and an ending point of the defined data segment.

4. The method of claim 1, wherein the first information identifying the defined data segment comprises a first starting point and a first ending point of the defined data segment, and the second information identifying the defined data segment comprises a second starting point and a second ending point of the defined data segment.

5. The method of claim 1, further comprising a step of enabling the user to modify the defined data segment.

6. The method of claim 5, wherein modifying the defined data segment includes changing at least one of a starting point and an ending point of the defined data segment.

7. The method of claim 1, wherein the first information identifying the defined data segment is transmitted to the remote location in accordance with a predefined time schedule.

8. The method of claim 1, wherein the second information identifying the defined data segment is adjusted at the remote location to compensate for time delay differences within the network.

9. A method for sharing information in a network, comprising steps of:
recording a data segment defined by one of a plurality of users at a first location;
transmitting information other than said recorded data segment identifying said recorded data segment, to a remote location, said information being data other than the recorded data segment and said transmission precluding the transmission of said recorded data segment; and
receiving from a second of the plurality of users, information identifying a defined data segment within said recorded data segment, other than said defined data segment within said recorded data and precluding the transmission of the recorded data.

10. The method of claim 9, wherein at least one of the data segments comprises a portion of a television program.

11. The method of claim 9, wherein the information identifying the data segments comprises a starting point and an ending point for each one of the data segments.

12. The method of claim 9, wherein the information identifying the data segments is received from the plurality of users in accordance with a predefined time schedule.

13. The method of claim 9, further comprising a step of adjusting the information identifying the data segments to compensate for time delay differences among the plurality of users.

14. An apparatus, comprising:
means for storing a data segment in accordance with inputs from a first user at a first of a plurality of user systems connected to a network;
means for transmitting first information identifying the stored data segment, other than the data segment, to a remote location from the first of the plurality of user systems connected to the network, said transmitting precluding the transmission of the stored data segment; and
means for receiving second information from a second of the plurality of systems connected to the network, identifying a data segment defined by a second user within the data segment stored at the first of the plurality of user systems connected to the network, said second information being other than the data segment and precluding the transmission of the data segment.

15. The apparatus of claim 14, wherein the stored data segment comprises a portion of a television program.

16. The apparatus of claim 14, wherein the user inputs specify a starting point and an ending point of the data segment.

17. The apparatus of claim 14, wherein the first information identifying the stored data segment comprises a first starting point and a first ending point of the stored data segment, and the second information associated with the stored data segment comprises a second starting point and a second ending point of the stored data segment.

18. The apparatus of claim 14, wherein the first information identifying the stored data segment is transmitted to the remote location in accordance with a predefined time schedule.

19. The apparatus of claim 14, wherein the second information identifying the defined data segment is adjusted at the remote location to compensate for time delay differences within the network.

* * * * *